Dec. 27, 1932.  E. WILDHABER  1,892,091
CUTTING TOOL FOR GENERATING NONINVOLUTE GEARS AND GEAR SHAPED ARTICLES
Filed March 6, 1930   4 Sheets-Sheet 1

INVENTOR
Ernest Wildhaber

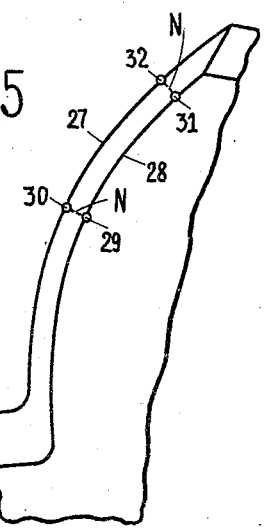
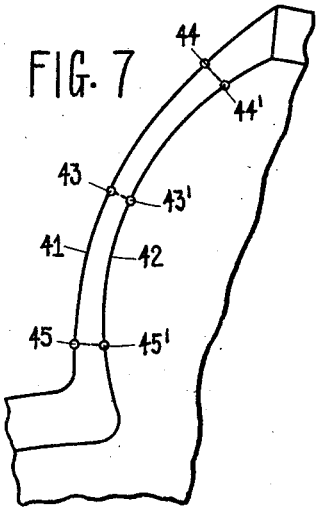
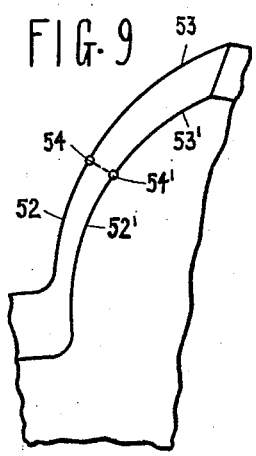
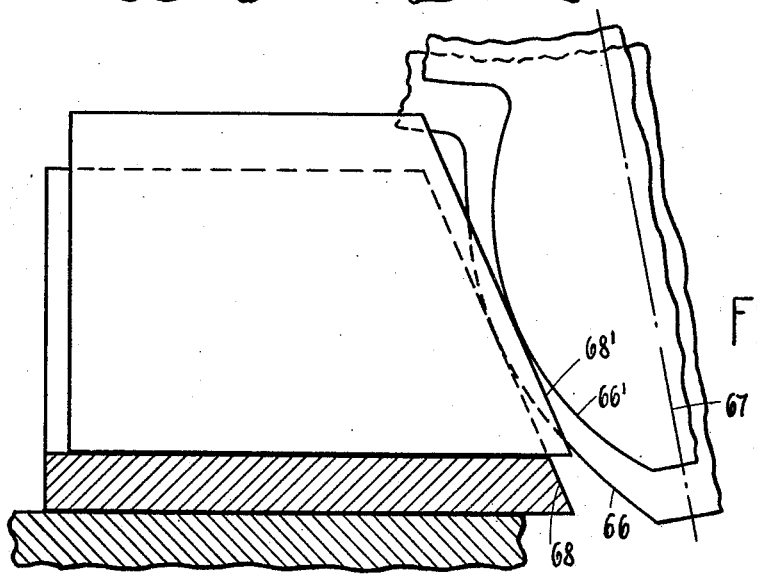
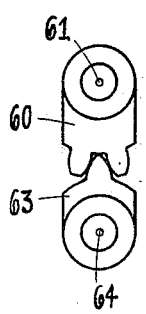

Dec. 27, 1932. E. WILDHABER 1,892,091
CUTTING TOOL FOR GENERATING NONINVOLUTE GEARS AND GEAR SHAPED ARTICLES
Filed March 6, 1930 4 Sheets-Sheet 3
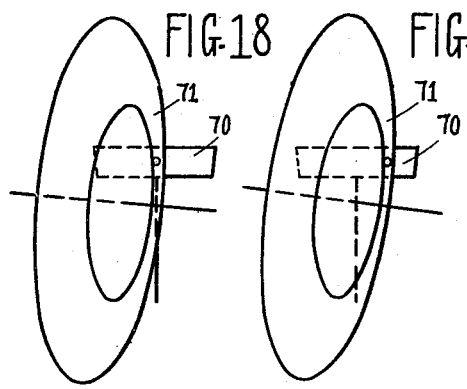
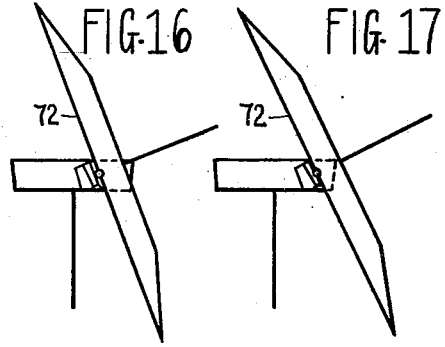
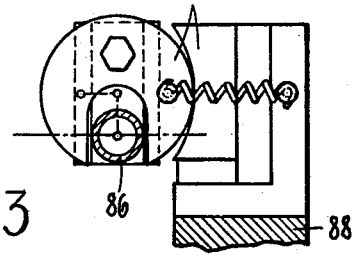
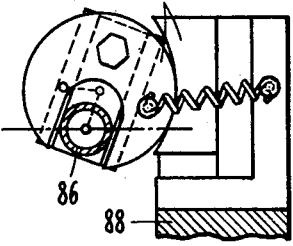
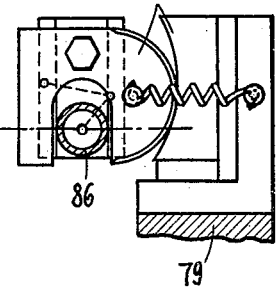
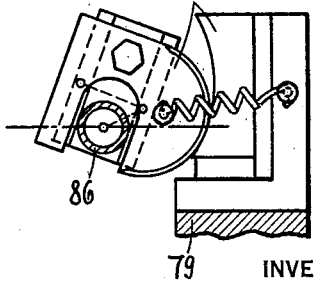
INVENTOR
Ernest Wildhaber INVENTOR
Ernest Wildhaber Patented Dec. 27, 1932

1,892,091

UNITED STATES PATENT OFFICE

ERNEST WILDHABER, OF BROOKLYN, NEW YORK

CUTTING TOOL FOR GENERATING NONINVOLUTE GEARS AND GEAR SHAPED ARTICLES

Application filed March 6, 1930. Serial No. 433,732.

The present invention relates to improvements in cutting tools for generating noninvolute gears and gear shaped articles.

Tools of the character referred to form gears and gear shaped articles in a process of generation, in which the tool and the blank move relatively to each other in the manner of intermeshing gears.

Tools of the character referred to are used for instance as shaping tools on gear shapers and other shaping machines. In this process the tool is reciprocated lengthwise of its axis, and the tool and the blank perform slow turning movements on their respective axes, so as to roll on each other in the manner of intermeshing gears. The tool may be reciprocated in a straight path or in a helicoidal path for cutting straight teeth or helicoidal teeth respectively.

Tools of the character referred to are also used as rotary tools, for instance for cutting screw threads and worms.

Hitherto tools of the character referred to were suited especially for cutting involute gears and articles containing involute surfaces.

Cutting tools are relieved back of the cutting edges, as well known. On account of said relief, which is a practical necessity, the diameter of a tool is reduced, when the tool is resharpened by regrinding the cutting faces of its cutting teeth. At the same time the side profiles are changed.

It is evident that a practical tool should have such shape, that the shape produced by said tool should be the same before and after any number of resharpening operations. It so happens that this requirement can be very easily complied with in the case of cutters for cutting involute teeth and involute surfaces. But no practical solution has hitherto been known as applied to cutting noninvolute gears and articles containing other than involute surfaces.

One object of the present invention is to devise a cutting tool for generating noninvolute gears and gear shaped articles, which is suited to reproduce the same shape during its whole life, and which can be made with high accuracy and expediency. A further object of the present invention is to broaden the field of the generating tools referred to, by providing accurate and practical tools suited to cut noninvolute shapes.

A further object is to provide a practical tool for generating noninvolute gears and articles, which contains relieved side surfaces suited to make line contact with its tangential planes, and suited to be accurately finished with an abrasive wheel having a plane working surface.

Another object is to provide a practical shaping tool for generating sprocket wheels, splines and other surfaces of noninvolute form.

A still other aim is to devise a practical tool for generating noninvolute gears of novel character, as described in my application entitled Gearing, filed February 17, 1930, Serial No. 429,092.

Other objects will appear in the course of the specification and from recital of the appended claims.

My invention will be described by way of examples illustrated in the accompanying drawings, in which Fig. 1 is a partial view of a cutting tool constructed in accordance with the present invention, said view being taken in the direction of the tool axis.

Fig. 5 is a view of a portion of a cutting tooth of a tool, the view being taken in the direction of the tool axis and illustrating the profiles of a relieved side surface in two planes perpendicular to said tool axis.

Fig. 7 is a view similar to Fig. 5 and referring to a preferred embodiment of the present invention.

Fig. 9 is a view similar to Fig. 7 and related to the rack profiles illustrated in Fig. 8.

Fig. 10 and Fig. 10a are diagrams explanatory of a way of experimentally determining information desired for forming cutting tools in accordance with the present invention.

Fig. 11 is a diagram further explanatory of the present invention.

Fig. 12 and Fig. 13 are diagrammatic plan views of a cutter and an abrasive wheel, illustrative of two different relative positions. Fig. 12 illustrates a position in which abrasive contact is made at the central portion of a relieved side surface of the cutter. Fig. 13 illustrates a position in which abrasive contact is made at the outward end of a relieved side surface.

Fig. 14 and Fig. 15 are front elevational views of diagrammatic nature, corresponding to Fig. 12 and Fig. 13 respectively.

Fig. 16 and Fig. 17 are diagrammatic plan views similar to Fig. 12 and Fig. 13 and illustrative of a cutter containing cutting teeth of substantially helical form.

Fig. 18 and Fig. 19 are diagrammatic plan views similar to Fig. 12 and Fig. 13 and illustrative of slightly modified relative positions between a cutter and an abrasive wheel.

Figure 20:
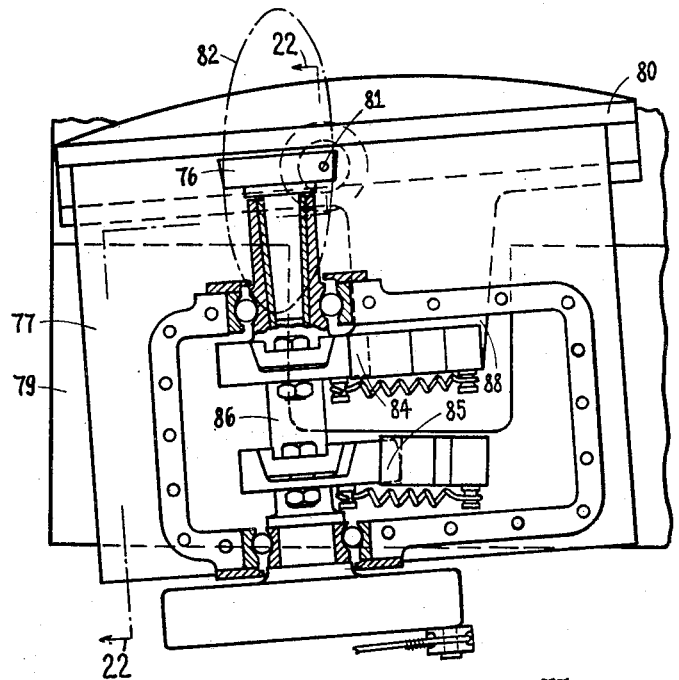

Fig. 20 is a plan view of the essential parts of a device for forming cutting tools constructed in accordance with the present invention, omitting the most obvious known elements.

Figures 21, 22:
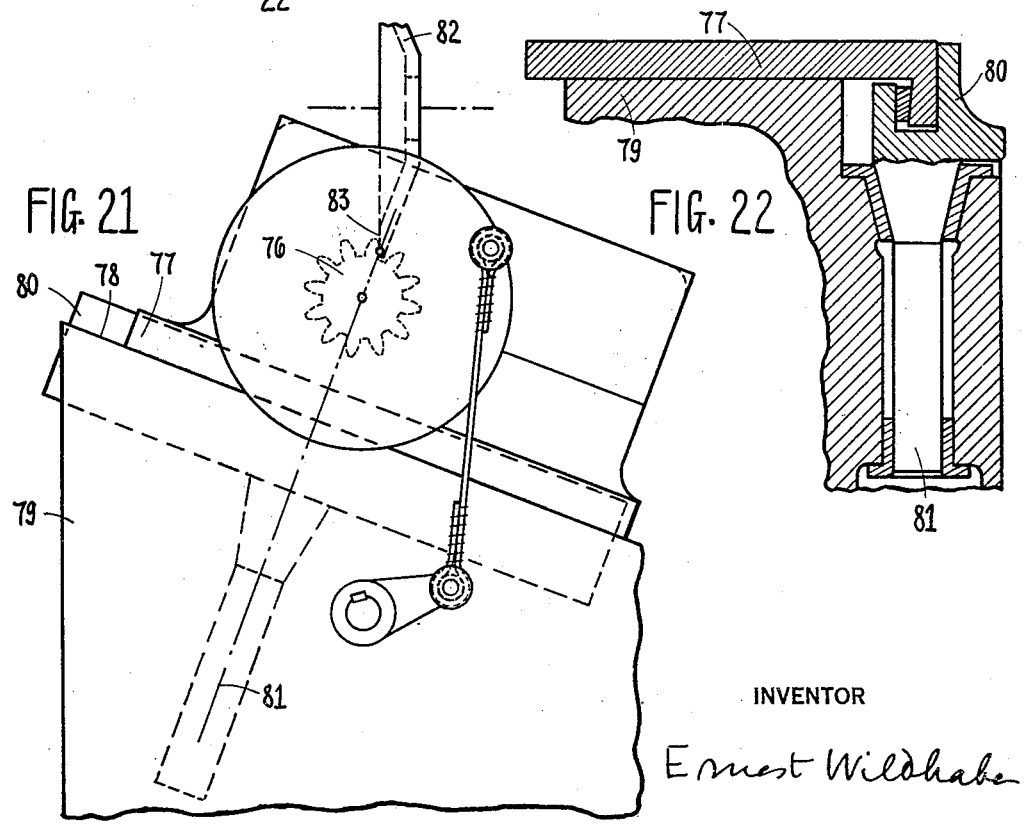

Fig. 21 is a front elevational view of the device also illustrated in Fig. 20.

Fig. 22 is a section along lines 22—22 of Fig. 20.

Fig. 23 and Fig. 24 are diagrammatic front elevational views of a cam device used in the machine illustrated in Fig. 20 to Fig. 22, illustrative of two different positions of said cam device.

Fig. 25 and Fig. 26 are diagrammatic front elevational views of another cam device used in the machine illustrated in Fig. 20 to Fig. 22, also illustrative of two positions of said device.

Figure 1:
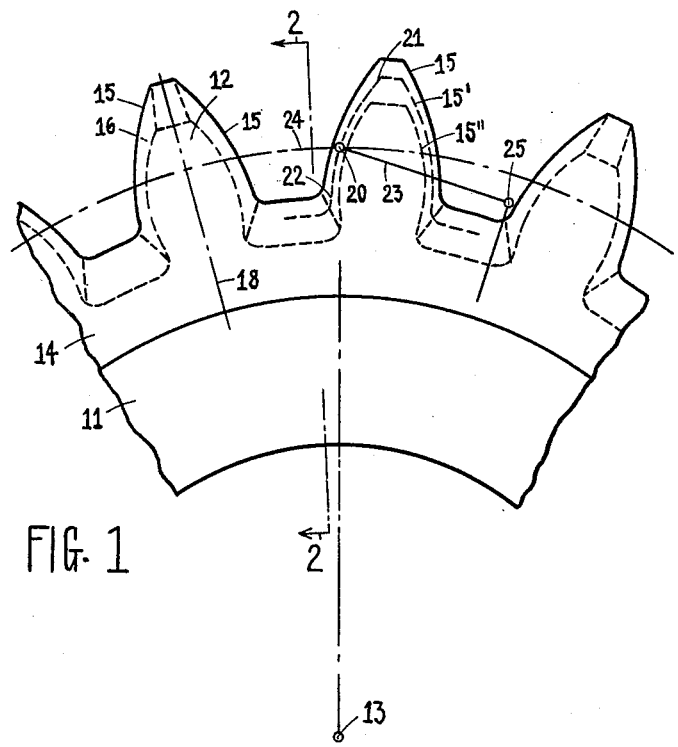
Figure 2:
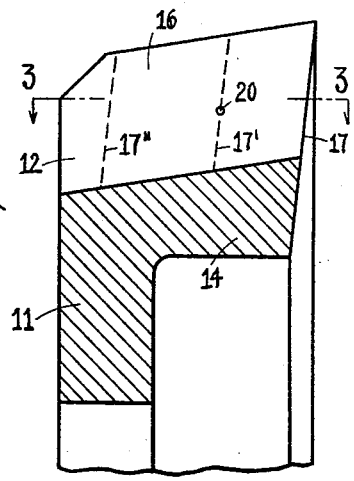
Fig. 2 is an axial section along lines 2—2 of Fig. 1.
Figure 3:
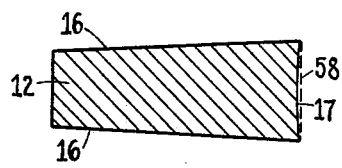
Fig. 3 is a section of a cutting tooth, along lines 3—3 of Fig. 2.

In Fig. 1, Fig. 2 and Fig. 3, numeral 11 denotes a cutting tool containing cutting teeth 12 arranged about an axis 13. The cutting teeth 12 project outwardly from a round and substantially disk like body portion 14. Convex cutting edges 15 are formed on relieved side surfaces 16 of the cutting teeth, as the intersection lines of said side surfaces with the cutting faces 17.

In the instance illustrated the cutting faces 17 of all the cutting teeth are situated in a surface of revolution concentric with axis 13, and more particularly in a conical surface. The cutting teeth 12 extend in a general direction parallel to axis 13 of the tool, and their relieved side surfaces are symmetrical with respect to planes containing axis 13 of the tool, one such plane being denoted with numeral 18.

The cutting tool may be resharpened by regrinding the cutting faces, in such manner that the conical surface containing said cutting faces is displaced towards the rear end of the cutting teeth in the direction of tool axis 13. Resharpening may be repeated, until the tool is nearly used up. The profile of said conical surface may assume a position as indicated in dotted lines 17' (see Fig. 2) at one time during the life of the tool; and another position 17'' when the tool is nearly used up.

In Fig. 1 the cutting edges which correspond to cutting face 17' are indicated in dotted lines 15' and those corresponding to cutting face 17'' are indicated in dotted lines 15''. The cutting edges 15' and 15'' are situated nearer to axis 13 than the cutting edges 15 and moreover differ in their shape from cutting edges 15 and between themselves. It is understood that a tool containing cutting edges 15' or 15'' is set to a different position relatively to a blank than a tool containing cutting edges 15. Its axis 13 is set closer to the blank, as well known, so that about the same depth of cut is produced.

How the exact shape of the cutting edges and of the relieved side surfaces 16 may be determined in all cases will be further described hereafter.

Instead of providing a system of gearing in which the rack contains the simplest tooth profile, I have devised a system of gearing based on a pinion of simplest profile and proceed now to embody said pinion by a cutting tool. Several characteristics of such a cutting tool will now be described with respect to a mean cutting profile 15', in a view lengthwise of axis 13 of the tool. The characteristics described also hold true for the profiles of the relieved side surfaces 16 in planes perpendicular to axis 13.

Cutting profile 15' contains a minimum radius of curvature at a point (20) intermediate its ends 21, 22, the ends being understood to be the points of the cutting profile where contact with the active tooth profile of a gear blank ceases. Cutters for generating involute gears on the other hand contain cutting profiles whose radii of curvature continuously decrease at points disposed nearer to the tool axis, as well known.

Cutting profile 15' is a curve symmetrical with respect to the profile normal (23) at a point (20) intermediate its ends.

More particularly, cutting profile 15' preferably contains a minimum curvature radius at its pitch point 20, which lies on pitch circle 24. The center of curvature of the cutting profile 15' adjacent point 20, in a view lengthwise of axis 13, coincides with point 25, which is the projection of the cutter center to normal 23. Moreover cutting profile 15′, or the profile of the relieved side surface 16 in a plane perpendicular to axis 13 is symmetrical with respect to the profile normal (23) at the pitch point.

Gear cutters of the character described are not limited by a base circle, as are involute cutters, and when formed in accordance with the present invention can be made to cut an improved form of tooth and to cut the same form of tooth throughout their life.

It should however be clearly understood that the present invention is not confined to gear cutters of the above said character and that said gear cutters only form one of its embodiments.

Generating cutters of the general character referred to have hitherto been finished after hardening by means of an abrasive wheel containing a plane or flat working surface, by moving a cutter blank relatively to said abrasive wheel while maintaining a constant angular relation between the axis of said abrasive wheel and the axis of said cutter blank.

Various forms of relief surfaces may be obtained in this manner by providing suitable motions of the cutter blank. The relief surfaces thus obtained have however all certain features in common, which will now be described with reference to Fig. 5 and Fig. 6. Fig. 5 is a view taken in the direction of the axis (13) of a cutter and illustrates the profiles of a relieved side surface in two planes which are both perpendicular to the cutter axis and which are therefore parallel to each other. In Fig. 5 no attention is paid to the cutting faces and to the cutting edges, a relieved side surface being characterized by the profiles 27, 28 in planes perpendicular to the cutter axis.

It can be demonstrated with the known methods of mathematics that the profiles 27, 28 are always equidistant curves, regardless of how they have been obtained, and provided only that the angular relation between the plane faced abrasive wheel and the axis of the blank is maintained constant. In other words, one profile (28) can be obtained from the other (27) by plotting a constant distance on the profile normals, and by connecting the so plotted points. So point 29 is disposed on the profile normal at point 30, at a constant distance N from point 30. Likewise point 31 is disposed on the profile normal at point 32, at the same distance N from point 32.

The cutting profiles which appear during the life of a cutter are substantially also equidistant curves, in a view along the cutter axis. Their errors will now be demonstrated on a rack profile with reference to Fig. 6. The errors obtained on the profile of a gear or gear shaped article are substantially the same as the errors obtained on the corresponding rack profile.

Figures 6, 8:
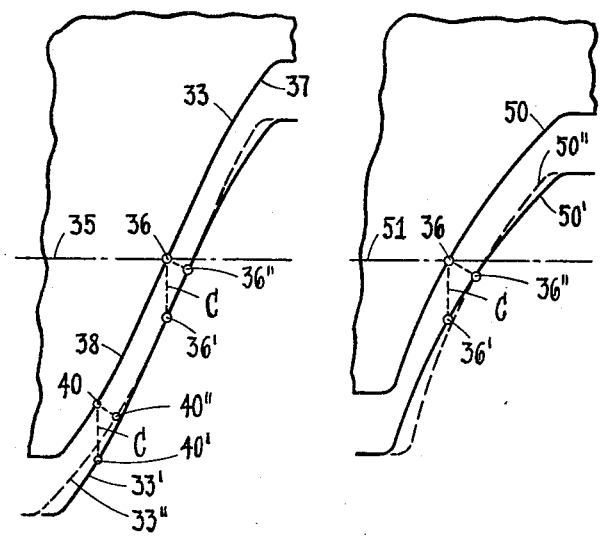
Fig. 6 is a diagram explanatory of the present invention and contrasting rack profiles obtainable with cutters having different side relief surfaces.
Fig. 8 is a diagram explanatory of the present invention and contrasting further rack profiles obtainable with cutters having different side relief surfaces.

In Fig. 6 numeral 33 denotes the profile of a rack as generated by an initial or mean cutting profile of a tool of the character referred to in Fig. 5. The pitch line of said rack is denoted with numeral 35. Profile 33 extends in polar symmetry with respect to point 36 and is concavely curved at its root portion 37 and convexly curved at its tip portion 38.

We will now consider the profile of the rack as generated by the same tool, after the tool has been resharpened so often that its axis should be approached to pitch line 35 by an amount C, in order to cut the same width of space. In its new position the resharpened tool should generate the same rack profile 33. For convenience the generated rack profile is indicated in Fig. 6 in relation with the old position of the cutter axis. In other words it is assumed that the cutter axis is at the same place when generating rack profile 33 with the first said cutting profile and when generating after resharpening. The rack profile desired in this constant position of the cutter axis is indicated in full lines 33′. It is identical with rack profile 33 and simply shifted by a distance C towards the cutter axis, in a direction perpendicular to pitch line 35. Point 36′ of rack profile 33′ corresponds to point 36 of rack profile 33; and distance 36—36′ equals the aforesaid distance C. Likewise any distance 40—40′ equals distance C.

A cutting tool suited to generate rack profile 33 should after repeated resharpening generate a rack profile 33′. Instead a rack profile 33″ is generated by a tool of the character referred to in Fig. 5. It can be demonstrated with the known methods of mathematics that the profiles generated by equidistant cutting profiles are also equidistant lines, and that therefore the rack profile 33″ actually generated by said cutting tool is equidistant to rack profile 33. In other words profile 33″ may be obtained from profile 33 by plotting a constant distance on the normals of profile 33 and by connecting the so plotted points. So for instance point 36″ is plotted on the profile normal at point 36; and point 40″ is plotted on the profile normal at point 40 of profile 33. And distance 36—36″ equals distance 40—40″.

The deviation of the dotted profile 33″ from profile 33′ shown in full lines clearly illustrates the error of the profile obtained.

It is seen that a cutting tool as aforesaid removes too much stock on both sides of the central portion of the rack profile, and that therefore the cutting profile of a more accurate cutting tool should recede on its top portion as well as on its root portion from the considered equidistant cutting profile, when coinciding with said equidistant profile in its central portions.

In other words the two cutting profiles should have a relation to each other substantially as indicated in Fig. 7 with respect to two profiles 41, 42. The two profiles 41, 42 have a minimum distance from each other adjacent their central portions, that is to say adjacent points 43, 43'. Their outward portions have a larger distance 44—44' from each other and their root portions also have a larger distance 45—45' from each other than distance 43—43' of their central portions.

Similarly the profiles of a relieved side surface in two planes perpendicular to the tool axis contain the same principal characteristics as explained for the profiles 41, 42.

For convenience let it be agreed to that said profiles are always compared in a view parallel to the tool axis.

The above said characteristics refer particularly to cutting tools for generating rack profiles having a minimum inclination adjacent their pitch point (36), and for generating gears conjugate to such racks or also conjugate to a pinion of the character described with reference to Fig. 1.

The exact form of the relieved side surfaces may be determined from the errors of side surfaces having equidistant or substantially equidistant cutting profiles, as a slight departure or modification from such side surfaces.

Another way of determining and also of forming said relieved side surfaces will be further described hereafter.

A further form of rack profile is indicated in Fig. 8. Rack profile 50 having a pitch line 51 may correspond for instance to a sprocket wheel having plane side surfaces. An accurate cutter should produce rack profiles 50 and 50' in different stages of its life, whereby profile 50' is identical in form with profile 50 and simply displaced with respect to the latter towards the cutter axis, as has been explained with respect to Fig. 6. Distance 36—36' equals the aforesaid distance C. A tool containing equidistant cutting profiles produces a rack profile 50'' equidistant to rack profile 50, instead of producing the desired rack profile 50'. The difference between the desired rack profile 50' and the one produced (50'') is the error of the cutter. It is clearly shown in Fig. 8. Again the cutting profile appearing at the later stage of the life of the cutter should not be equidistant to the original cutting profile but should be modified in a manner that the top portion of the cutting profile recedes back of the equidistant line, whereas the root portion protrudes over it. This statement also holds true for the profiles 52, 52' (Fig. 9) of a relieved side surface of the cutting tool, in two planes perpendicular to the tool axis, said profiles being viewed lengthwise of said axis. Fig. 9 illustrates a relieved side surface of a cutting tool suited to produce a rack profile of the character indicated in Fig. 8 and profiles of gears and gear shaped articles corresponding to said rack profile.

Profiles 52, 52' are diverging from each other, and have a larger distance from each other adjacent their outward ends 53, 53' than adjacent their central portions 54, 54'.

Profiles 41, 42 of Fig. 7 can also be considered as the profiles of a relieved side surface in two planes perpendicular to the tool axis. They are also diverging from each other. They have however a minimum distance at their central portions and diverge from said central portions towards the inside as well as towards the outside.

Figure 4:
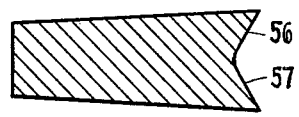
Fig. 4 is a section similar to Fig. 3 of a cutting tooth of modified form.

It is understood that the present invention is not confined to cutters having cutting faces as illustrated in Fig. 2 and Fig. 3. The cutting faces may have any other suitable form. For instance they may have a profile as outlined in Fig. 4 and consist of two planes 56, 57 angularly disposed to each other. In some instances the cutting faces may be chosen to lie simply in a plane perpendicular to the cutter axis. A cutting face of this character is outlined in Fig. 3 by dotted line 58.

While I have referred particularly to cutting tools containing cutting teeth of a general direction parallel to the cutter axis, it is evident that the present invention also applies to cutting tools having substantially helical cutting teeth, and the same general principles apply to the latter cutting tools as to those already described.

The normal distance of adjacent profiles 41, 42 (Fig. 7) and 52, 52' (Fig. 9) at any point is closely related to the inclination of the corresponding tangential plane of the relieved side surface. It is understood by those familiar with mathematics that the inclination of a tangential plane with respect to the tool axis is the larger, the larger the normal distance of the two profiles 41, 42, or 52, 52' is adjacent a point of tangency: The tangential plane at point 44 (Fig. 7) has a larger inclination with respect to the tool axis than the tangential plane at point 43.

A preferred form of a relieved side surface constructed in accordance with the present invention will now be further described. First two profiles of a relieved side surface are exactly determined, for instance two cutting profiles which are formed on the relieved side surface at different times during the life of the tool. The said two profiles correspond to different positions of the cutter axis with respect to the axis of the blank. Reference is made to Fig. 10 and Fig. 10a, in which numeral 60 denotes a portion of a blank whose tooth contours are given, and which is rotatable on an axis 61. A tool body is denoted with numeral 63. The first cutting profile of the tool 63 corresponds to a position 64 of the tool axis, and may be readily determined with the known methods. In a view lengthwise of the tool axis, the first said cutting profile is the curve conjugate to the given profile of blank 60. The second cutting profile corresponds to a position 64' of the tool axis, with respect to axis 61 of the blank, see Fig. 10a. It can also be determined from the given profile of the blank with the same methods. The profile of the blank is the same in both instances. The ratio between blank 60 and tool 63 is also the same and equals the ratio of the number of teeth of a finished blank and a finished tool.

If so desired the tooth profiles in question may be determined through generation rather than computation. In this case the blank 60 is provided with cutting profiles and is relieved back of said cutting profiles, which latter may be made identical with the given contour of the blank. A tool blank 63 is then reciprocated in the direction of its axis 64 or 64', and it is slowly turned about its axis while blank 60 containing said cutting profiles is turned about its axis 61 in timed relation to the turning motion of tool blank 63. In other words the feeding motions described with reference to Fig. 10 and Fig. 10a are carried out in addition to a cutting motion.

The two cutting profiles of the tool may then be determined as the intersection lines of the generated surfaces with the given cutting faces.

After the two cutting profiles have been exactly determined, (or two other suitable profiles of a relieved side surface), they may be spaced apart axially a distance corresponding to a suitable relief, and so that their angular position corresponds to the general direction of the cutting teeth. In the case of cutting teeth extending in the general direction of the cutter axis the median plane of the two side profiles of a cutting tooth is the same for both cutting profiles, determined in accordance with Fig. 10 and Fig. 10a.

The term median plane is further explained hereafter with reference to Fig. 11.

A relieved side surface may be mathematically defined as the surface which is enveloped by planes which are tangent to both cutting profiles. There exist of course an infinite number of such planes, and they are all tangential planes of the enveloped surface. It can be readily demonstrated that said tangential planes contact along straight lines with said surface.

The said tangential planes may be represented by a plane working surface of an abrasive wheel, and the tool blank may be given such relative motions with respect to said plane working surface that said plane working surface passes through the positions of the aforesaid tangential planes relatively to the tool blank.

In Fig. 11 numerals 66 and 66' denote two profiles generated in accordance with Fig. 10 and with Fig. 10a respectively. The median plane 67, that is to say the plane of symmetry of the two sides of a cutting tooth, is the same for both profiles 66 and 66' and, as is readily understood, contains the tool axis. Fig. 11 serves especially to illustrate a way of measuring the difference of the two profiles 66 and 66' from equidistant curves. The two profiles engage rack elements 68, 68' respectively. When said profiles are turned about the tool axis the two rack elements move in a slightly different manner. By measuring the difference of the paths covered by said two rack elements, information may be secured which is useful in the production of the tools.

The said difference is a measure for the change of the inclination of the tangential plane with respect to the tool axis, at various points of the cutting profile. The inclination of a tangential plane, and of the plane working surface of an abrasive wheel, with respect to the tool axis changes substantially in proportion to said differences, as is readily understood from the foregoing.

In the diagrammatic Figures 12 to 15, a tool blank 70 is shown in various relative positions with respect to an abrasive wheel 71, having a plane working surface 72. In the relative position illustrated by Fig. 12 and Fig. 14, abrasive contact is made adjacent a central point or portion 73 of a relieved side surface of tool 70, of which in the diagrammatic figures only one cutting tooth is illustrated. In the relative position illustrated in Fig. 13 and Fig. 15 abrasive contact is made at a point or portion 74 of the outward end of a relieved side surface. It is noted that plane 72 includes a larger angle with respect to the axis 75 of tool 70, when abrasive contact is made at the outward portion (74) of a relieved side surface, than when abrasive contact is made at its central portion (73).

Fig. 16 and Fig. 17 illustrate two relative positions of a tool blank and a plane working surface 72 of an abrasive wheel, where the tool blank contains substantially helical cutting teeth. It is noted that the inclination of plane 72 is larger in the position shown in Fig. 17, where abrasive contact is made at the outward end of a relieved side surface.

The same characteristic is shown in Fig. 18 and Fig. 19, which illustrate a modified relative motion between the abrasive wheel and a tool blank.

For further particulars concerning a suitable method of making tools, reference is made to my companion application, entitled "Method of and device for forming cutting tools" filed on even date herewith, namely on March 6, 1930, Serial No. 433,731.

A device suitable for forming tools constructed in accordance with the present invention will now be outlined with reference to Figures 20 to 26.

A tool blank 76 is rotatably mounted on a slide 77, which is movable on an inclined plane 78 of a base 79. Slide 77 engages a bar or arm 80, which is pivoted on an axis 81 perpendicular to plane 78, and which determines the angular position of slide 77. An abrasive wheel 82 having a plane working surface 83 is mounted adjacent tool blank 76, and is rotated in engagement with a relieved side surface of said tool blank. The motion of the tool blank 76 with respect to abrasive wheel 82 is controlled by two cam devices 84, 85, whose cams are secured to a spindle 86, which also carries the tool blank 76.

Cam device 84 is separately illustrated in Fig. 23 and Fig. 24; and cam device 85 is separately shown in Fig. 25 and Fig. 26. They comprise adjustable cams of circular or broadly of symmetrical form, cooperating with elements of curved profile, namely of concave circular profile.

Cam devices of the character shown are suited for forming a great variety of cutting tools.

Generating motion is imparted to the machine by rocking spindle 86.

The cam of cam device 84 cooperates with an element secured to a projection 88 of arm 80 (Fig. 20), and thereby controls the motion of slide 77 lengthwise of arm 80, which motion determines the shape of a mean profile of the relieved side surfaces of tool blank 76.

The cam of cam device 85 cooperates with a stationary element secured to base 79, and controls the angular position of slide 77.

Various changes and modifications may be made in my invention without departing from its spirit. For definition of its scope it is relied upon the appended claims.

What I claim is:

1. Cutting tool for generating non involute gears and gear shaped articles, comprising a cutter body having teeth projecting outwardly from an axis, said teeth having relieved and curved side surfaces forming cutting edges at the intersection with cutting faces, the profiles of a relieved side surface in two planes perpendicular to said axis being curves diverging from each other on both ends, said profiles being viewed lengthwise of said axis.

2. Cutting tool for generating non involute gears and gear shaped articles, comprising a cutter body having teeth projecting outwardly from an axis, said teeth being arranged in a circle and having relieved and curved side surfaces forming convex cutting edges at the intersection with cutting faces, the profiles of a relieved side surface in two planes perpendicular to said axis being curves having a minimum distance from each other adjacent their central portions and diverging from each other on both sides of said central portions, said profiles being viewed lengthwise of said axis.

3. Cutting tool for generating non involute gears and gear shaped articles, comprising a cutter body having teeth projecting outwardly from an axis, said teeth being arranged in a circle and having relieved and curved side surfaces forming convex cutting edges at the intersection with cutting faces, the profiles of a relieved side surface in two planes perpendicular to said axis being convex curves having changing distances from each other and larger distances adjacent their root portions than adjacent their central portions, said profiles being viewed lengthwise of said axis.

4. Cutting tool for generating non involute gears and gear shaped articles, comprising a cutter body having teeth projecting outwardly from an axis, said teeth being arranged in a circle and having ground relieved and curved side surfaces forming convex cutting edges at the intersection with cutting faces, a side surface being a surface such as can be completely enveloped by planes including varying angles with the axis of the cutting tool.

5. Cutting tool for generating non involute gears and gear shaped articles, comprising a cutter body having teeth projecting outwardly from an axis, said teeth being arranged in a circle and having ground relieved and curved side surfaces forming convex cutting edges at the intersection with cutting faces, the side surfaces being surfaces such as can be completely enveloped by identical surfaces of revolution, the axes of said surfaces of revolution including varying angles with the axis of the cutting tool, and the profile of an axial section of said surface of revolution consisting of profile elements of constant form so that said profile is either a straight line or a circular arc.

6. Cutting tool for generating non involute gears and gear shaped articles, comprising a cutter body having teeth projecting outwardly from an axis, said teeth being arranged in a circle and having relieved and curved side surfaces forming convex cutting edges at the intersection with cutting faces, a relieved side surface being formed to make line contact with its tangential planes, said tangential planes including different angles with said axis.

7. Cutting tool for generating non involute gears and gear shaped articles, comprising a cutter body having teeth projecting outwardly from an axis, said teeth being arranged in a circle and having relieved and curved side surfaces forming convex cutting edges at the intersection with cutting faces, a relieved side surface being formed to make line contact with its tangential planes, a tangential plane applied to said surface adjacent its root having a larger inclination with respect to said axis than a tangential plane applied at the center portion of said surface.

8. Cutting tool for generating non involute gears and gear shaped articles, comprising a cutter body having teeth projecting outwardly from an axis, said teeth being arranged in a circle and having relieved and curved side surfaces forming convex cutting edges at the intersection with cutting faces, a relieved side surface being formed to make line contact with its tangential planes, a tangential plane applied to said surface adjacent its outward end having a larger inclination with respect to said axis than a tangential plane applied at the center portion of said surface.

9. Cutting tool for generating non involute gears and gear shaped articles, comprising a cutter body having teeth projecting outwardly from an axis, said teeth being arranged in a circle and having relieved and curved side surfaces forming convex cutting edges at the intersection with cutting faces, a relieved side surface being formed to make line contact with its tangential planes, said tangential planes having differing inclinations with respect to said axis, a tangential plane applied at the center portion of said surface having a minimum inclination with respect to said axis.

10. Cutting tool for generating non involute gears, comprising a cutter body having teeth projecting outwardly from an axis, said teeth being arranged in a circle and having relieved and curved side surfaces forming convex cutting edges at the intersection with cutting faces, opposite relieved side surfaces being symmetrical with respect to a plane containing said axis, a relieved side surface being formed to make line contact with its tangential planes, a tangential plane applied to said surface adjacent its outward end having a larger inclination with respect to said axis than a tangential plane at the center portion of said surface.

11. Cutting tool for generating non involute gears and gear shaped articles, comprising a cutter body having teeth projecting outwardly from an axis, said teeth being arranged in a circle and having relieved and curved side surfaces forming convex cutting edges at the intersection with cutting faces, opposite relieved side surfaces of a cutting tooth being symmetrical with respect to a plane containing said axis, a relieved side surface being formed to make line contact with its tangential planes, said tangential planes having differing inclinations with respect to said axis, a tangential plane applied at the center portion of said surface having a minimum inclination with respect to said axis.

12. Cutting tool for generating non involute gears, comprising a cutter body having teeth projecting outwardly from an axis, said teeth being arranged in a circle and having curved side surfaces forming entirely convex cutting edges at the intersection with cutting faces, a convex cutting edge being a single curve free from abrupt changes of its radii of curvature and having a minimum radius of curvature at a point intermediate the ends of said convex cutting edge, the radii of curvature at both ends being larger than at said intermediate point.

13. Cutting tool for generating non involute gears, comprising a cutter body having teeth projecting outwardly from an axis, said teeth being arranged in a circle and having relieved and curved side surfaces forming convex cutting edges at the intersection with cutting faces, the profile of a relieved side surface in a plane perpendicular to said axis being symmetrical with respect to the profile normal at a mean profile point and having at both ends larger radii of curvature than at said point.

14. Cutting tool for generating non involute gears, comprising a cutter body having teeth projecting outwardly from an axis, said teeth being arranged in a circle and having curved side surfaces forming convex cutting edges at the intersection with cutting faces, the profile of a curved side surface in a plane perpendicular to said axis having a minimum radius of curvature at a point whose tangent is inclined at least ten degrees to a radius drawn through said point and said axis, the radii of curvature at both ends of said profile being larger than at said point.

15. Cutting tool for generating non involute gears, comprising a cutter body having teeth projecting outwardly from an axis, said teeth being arranged in a circle and having relieved and curved side surfaces forming convex cutting edges at the intersection with cutting faces, the profile of a relieved side surface in a plane perpendicular to said axis having a minimum radius of curvature at a point whose tangent is inclined at least ten degrees to a radius drawn through said point and said axis, the radii of curvature of said profile being free from abrupt changes and increasing from said point towards the inward end of said profile.

16. Cutting tool for generating non involute gears, comprising a cutter body having cutting teeth projecting outwardly from an axis, said teeth being arranged in a circle and having curved side surfaces forming convex cutting edges at the intersection with cutting faces, the profile of a side surface in a plane perpendicular to said axis having a minimum radius of curvature adjacent its central portion, the radii of curvature at both ends of said profile being larger than at said central portion.

ERNEST WILDHABER.